US007948957B2

(12) United States Patent
Kakura

(10) Patent No.: US 7,948,957 B2
(45) Date of Patent: May 24, 2011

(54) SPREAD CODE ASSIGNING METHOD IN CODE SPREAD RADIO COMMUNICATION USING A PLURALITY OF TRANSMISSION/RECEPTION ANTENNAS AND CODE SPREAD RADIO COMMUNICATION SYSTEM USING THE SAME

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 786 days.

(21) Appl. No.: 10/561,128

(22) PCT Filed: Jun. 30, 2004

(86) PCT No.: PCT/JP2004/009603
§ 371 (c)(1),
(2), (4) Date: Dec. 16, 2005

(87) PCT Pub. No.: WO2005/002104
PCT Pub. Date: Jan. 6, 2005

(65) Prior Publication Data
US 2007/0116091 A1    May 24, 2007

(30) Foreign Application Priority Data

Jun. 30, 2003 (JP) ................................. 2003-187950

(51) Int. Cl.
*H04B 7/216* (2006.01)
*H04B 1/00* (2006.01)
(52) U.S. Cl. .......................... 370/342; 370/335; 375/130
(58) Field of Classification Search .................. 370/342, 370/335, 441, 479
See application file for complete search history.

(56) References Cited

U.S. PATENT DOCUMENTS 5,903,556 A * 5/1999 Matui ........................... 370/342
(Continued)

FOREIGN PATENT DOCUMENTS

EP 940927 A2 * 9/1999
(Continued)

OTHER PUBLICATIONS

Authors: Yu-Wen Chang and Evaggelos Geraniotis, Title: Optimal Policies for Handoff and Channel Assignment in Networks of LEO Satellites using CDMA, Date: Feb. 1998, Publisher: Kluwer Academic Publishers, Publication: Wireless Networks, vol. 4, Issue: 2, pp. 181-187.*

(Continued)

*Primary Examiner* — Nick Corsaro
*Assistant Examiner* — Tangela T. Chambers
(74) *Attorney, Agent, or Firm* — Scully, Scott, Murphy & Presser, P.C.

(57) ABSTRACT

A receiver connected to a plurality of reception antennas includes a propagation path correlation estimation circuit. The propagation path correlation estimation circuit calculates a correlation value of each propagation path between each of the transmission antennas and each of the reception antennas and transmits the calculation result as propagation path correlation information ($S_{COR}$). A transmitter connected to a plurality of transmission antennas includes a spread code assigning circuit. According to the propagation path correlation information, the spread code assigning circuit assigns only spread codes orthogonal to each other for the transmission antenna corresponding to a correlation value exceeding a threshold value and, for a transmission antenna having no propagation path of a correlation value exceeding the threshold value, assigns a spread code without considering orthogonality to a spread code in the other transmission antenna.

16 Claims, 8 Drawing Sheets

U.S. PATENT DOCUMENTS

| | | | |
|---|---|---|---|
| 6,611,676 B2 * | 8/2003 | Ue et al. ........................... | 455/69 |
| 6,804,216 B1 * | 10/2004 | Kuwahara et al. ............. | 370/335 |
| 7,298,722 B2 * | 11/2007 | Sudo ............................. | 370/335 |
| 2001/0022807 A1 * | 9/2001 | Yotsumoto .................... | 375/147 |
| 2002/0037030 A1 * | 3/2002 | Goto ............................. | 375/152 |
| 2003/0123530 A1 * | 7/2003 | Maeda et al. ................. | 375/148 |
| 2004/0028157 A1 * | 2/2004 | Aoki et al. .................... | 375/347 |
| 2004/0179627 A1 * | 9/2004 | Ketchum et al. .............. | 375/267 |

FOREIGN PATENT DOCUMENTS

| | | |
|---|---|---|
| EP | 1 063 791 A2 | 12/2000 |
| JP | 10-145282 | 5/1998 |
| JP | 11-298369 | 10/1999 |
| JP | 2000-59334 | 2/2000 |
| JP | 2001-8262 | 1/2001 |
| JP | 2003-249882 | 9/2003 |
| JP | 2004-166038 | 6/2004 |
| JP | 2004-222241 | 8/2004 |

OTHER PUBLICATIONS

Mudulodu S. et al., "A Simple Multiplexing Scheme for MIMO Systems Using Multiple Spreading Codes", *Signals, Systems and Computers*, 1:769-774 (2000).

Chinese Official Action dated May 20, 2010 together with an English language translation.

Japanese Official Action dated Jul. 29, 2009 together with an English language translation.

* cited by examiner

SPREAD CODE ASSIGNING METHOD IN CODE SPREAD RADIO COMMUNICATION USING A PLURALITY OF TRANSMISSION/RECEPTION ANTENNAS AND CODE SPREAD RADIO COMMUNICATION SYSTEM USING THE SAME

TECHNICAL FIELD

The present invention relates to a method of assigning spread codes to each of propagation paths or each of transmission antennas in code spread radio communication using a plurality of transmission/reception antennas, and a code spread radio communication system to which such a spread code assigning method is applied.

BACKGROUND ART

A Multiple-Input Multiple-Output method (hereinafter abbreviated as a MIMO method) using a plurality of antennas for transmission and reception is known as a method of improving frequency utilization efficiency by means of parallel transmissions utilizing independency of propagation paths. In the MIMO method, a plurality of propagation paths are set between the transmission side and the reception side by using a plurality of antennas at least on one side of either transmission side or reception side.

On the other hand, a Code Division Multiple Access method (hereinafter abbreviated as a CDMA method) is known as a method for realizing circuit multiplex at the same time and at the same frequency by using code spread.

A description of a conventional code spread radio communication system combining the MIMO method and the CDMA method will be provided with reference to FIG. 1.

This code spread radio communication system is provided with a transmitter 301 disposed on the transmission side and a receiver 302 disposed on the reception side. Here, it is assumed for simplifying the explanation that the transmitter 301 is provided with two antennas 311 and 312, and the receiver 302 is provided with two antennas 321 and 322.

The transmitter 301 is provided with transmission signal generation circuits 103 and 104 connected to the antennas 311 and 312, respectively, a spread code assigning circuit 304, and a scheduler 303. The spread code assigning circuit 304 supplies the transmission signal generation circuits 103 and 104 with code assigning signals $S_{ALOC1}$ and $S_{ALOC2}$, respectively. The scheduler 303 outputs a data making request signal $S_{DDA}$ to the transmission signal generation circuits 103 and 104, and it outputs to the spread code assigning circuit 304, a code multiplex number notifying signal $S_{CNUM}$ for notifying a code multiplex number (code multiplex number) corresponding to a data volume. The code multiplex number described here is the one showing how many spread codes are used for spread modulation and how the spread modulated signals are multiplexed for transmission in each of the transmission signal generation circuits 103 and 104. In other words, the code multiplex number shows how many spread codes are used for each propagation path.

The data making request signal $S_{DDA}$, the code assigning signal $S_{ALOC1}$ and information $S_{DATA}$ to be transmitted are inputted to the transmission signal generation circuit 103. The transmission signal generation circuit 103 then generates a transmission data from the information $S_{DATA}$ to be transmitted according to the data making request signal $S_{DDA}$. The transmission signal generation circuit 103 spreads and multiplexes this transmission data with the spread codes corresponding to the code assigning signal $S_{ALOC1}$ and outputs a transmission signal $S_{TX1}$. The transmission signal $S_{TX1}$ is transmitted from the antenna 311. Similarly, the transmission signal generation circuit 104 makes a transmission data according to the data making request signal $S_{DDA}$, and spreads and multiplexes this transmission data with the spread codes corresponding to the code assigning signal $S_{ALOC2}$ for outputting a transmission signal $S_{TX2}$. The transmission signal $S_{TX2}$ is transmitted from the antenna 312. Since the transmission signals $S_{TX1}$ and $S_{TX2}$ transmitted from the antennas 311 and 312 are subjected to the code spread, respectively, they are formed in code spread transmission signals, respectively. The spread code assigning circuit 304 receives the code multiplex number notifying signal $S_{CNUM}$, and outputs the spread code assigning signals $S_{ALOC1}$ and $S_{ALOC2}$ for designating as many spread codes as the number corresponding to this input signal to each of the propagation paths.

Referring to FIG. 2, a description of a configuration of the transmission signal generation circuits 103 and 104 will be provided. Since the transmission signal generation circuits 103 and 104 have the same circuit configuration, an explanation will be made here with the transmission signal generation circuit 401. Let the spread code assigning signal supplied to the transmission signal generation circuit 401 be $S_{ALOC}$.

The transmission signal generation circuit 401 is provided with a data generation circuit 402, an encoder 403, an interleaver 404, a serial/parallel converter 405, a spread unit 406 and a code multiplex unit 407. The data generation circuit 402 receives the information $S_{DATA}$ to be transmitted as an input, and outputs a transmission data $S_{TXD}$ under a control given by the data making request signal $S_{DDA}$. The encoder 403 encodes the transmission data $S_{TXD}$ and outputs an encoded data $S_{CODED}$. The interleaver 404 rearranges (interleaves) the bit arrangement of the encoded data $S_{CODED}$ according to a predetermined rule, and outputs it as an interleaver output signal $S_{IO}$.

Here, it is assumed that the code multiplex number for each transmission antenna is 4. In this case, the serial/parallel converter 405 receives the code assigning signal $S_{ALOC}$ as an input, parallel converts the interleaver output signal $S_{IO}$ according to the code multiplex number, and outputs them as spread unit input signals $S_{SPL0}$, $S_{SPL1}$, $S_{SPL2}$ and $S_{SPL3}$. The spread unit 406 spreads the spread unit input signals $S_{SPL0}$, $S_{SPL1}$, $S_{SPL2}$ and $S_{SPL3}$ with spread codes $C_0$, $C_1$, $C_2$ and $C_3$ which are orthogonal to each other designated by the code assigning signal $S_{ALOC}$, and outputs spread unit output signals $S_{SPO0}$, $S_{SPO1}$, $S_{SPO2}$ and $S_{SPO3}$. The code multiplex unit 407 multiplexes the spread unit output signals $S_{SPO0}$, $S_{SPO1}$, $S_{SPO2}$ and $S_{SPO3}$, and outputs a transmission signal $S_{TX}$.

The code assigning signal $S_{ALOC}$ is a signal for designating the spread codes used in the spread unit 406. By knowing how many spread codes are designated in the code assigning signal $S_{ALOC}$, the code multiplex number designated to the transmission signal generation circuit 401 can be comprehended.

Referring back to FIG. 1, In the receiver 302, the reception signals $S_{RX1}$ and $S_{RX2}$ are respectively received from the antennas 321 and 322. The receiver 302 is provided with a demodulation circuit 305 for demodulating the reception signals $S_{RX1}$ and $S_{RX2}$. The demodulation circuit 305 outputs the regenerated data $S_{DD1}$ and $S_{DD2}$ corresponding to the transmission data generated in the transmission signal generation circuits 103 and 104.

FIG. 3 illustrates an example of internal configuration of the demodulation circuit 305. Here, it is assumed that the maximum value of the code multiplex number is 4. In this case, the demodulation circuit 305 is provided with 4 de-spreaders 502 through 505 connected to the antenna 321 and 4 de-spreaders 506 through 509 connected to the antenna 322. A linear filter 510 is connected to the outputs of the de-spreaders 502 and 506, and a linear filter 511 is connected to the outputs of the de-spreaders 503 and 507. Similarly, a linear filter 512 is connected to the outputs of the de-spreaders 504 and 508, and a linear filter 513 is connected to the outputs of the de-spreaders 505 and 509. Each of the linear filters 510 through 513 is provided for suppressing signal components except for the transmission signal. The demodulation circuit 305 is also provided with a parallel/serial converter 514 for parallel/serial converting the outputs of the linear filters 510 through 513. The demodulation circuit 305 is further provided with two deinterleavers 515 and 516 connected to the output side of the parallel/serial converter 514, and decoders 517 and 518 respectively connected to the output side of the deinterleavers 515 and 516.

The de-spreaders 502 through 505 connected to the antenna 321 receive the reception signal $S_{RX1}$ from the antenna 321 as an input. The de-spreaders 502 through 505 de-spread the reception signal $S_{RX1}$ respectively with the spread codes $C_0$, $C_1$, $C_2$ and $C_3$, and output de-spreader output signals $S_{DSO10}$, $S_{DSO11}$, $S_{DSO12}$ and $S_{DSO13}$. The de-spreaders 506 through 509 connected to the antenna 322 receive the reception signal $S_{RX2}$ from the antenna 322 as an input. The de-spreaders 506 through 509 de-spread the reception signal $S_{RX2}$ respectively with the same spread codes $C_0$, $C_1$, $C_2$ and $C_3$ as the de-spreader 502 through 506, and output de-spreader output signals $S_{DSO20}$, $S_{DSO21}$, $S_{DSO22}$ and $S_{DSO23}$. Of course, the spread codes $C_0$, $C_1$, $C_2$ and $C_3$ mentioned here are respectively the same as the spread codes $C_0$, $C_1$, $C_2$ and $C_3$ used in the transmitter 301.

The linear filter 510 receives the de-spreader output signals $S_{DSO10}$ and $S_{DSO20}$. The linear filter 510 suppresses the signal components corresponding to the transmission signals other than the transmission signals $S_{TX1}$ and $S_{TX2}$ in the de-spreader output signals $S_{DSO10}$ and $S_{DSO20}$. The linear filter 510 outputs filter output signals $S_{FO10}$ and $S_{FO20}$ corresponding to the components spread with the spread code $C_0$ in the transmission signals $S_{TX1}$ and $S_{TX2}$. Similarly, the linear filter 511 receives the de-spreader output signals $S_{DSO11}$ and $S_{DSO21}$, and suppresses the signal components corresponding to the transmission signals other than the transmission signals $S_{TX1}$ and $S_{TX2}$ in the de-spreader output signals $S_{DSO11}$ and $S_{DSO21}$. The linear filter 511 outputs filter output signals $S_{FO11}$ and $S_{FO21}$ corresponding to the components spread with the spread code $C_1$ in the transmission signals $S_{TX1}$ and $S_{TX2}$. The linear filter 512 receives the de-spreader output signals $S_{DSO12}$ and $S_{DSO22}$, and outputs filter output signals $S_{FO12}$ and $S_{FO22}$ corresponding to the components spread with the spread code $C_2$ in the transmission signals $S_{TX1}$ and $S_{TX2}$. The linear filter 513 receives the de-spreader output signals $S_{DSO13}$ and $S_{DSO23}$, and outputs filter output signals $S_{FO13}$ and $S_{FO23}$ corresponding to the components spread with the spread code $C_3$ in the transmission signals $S_{TX1}$ and $S_{TX2}$.

The parallel/serial converter 514 parallel/serial converts the filter output signals $S_{FO10}$, $S_{FO11}$, $S_{FO12}$ and $S_{FO13}$ for outputting the deinterleaver input signal $S_{DII1}$, and also parallel/serial converts the filter output signals $S_{FO20}$, $S_{FO21}$, $S_{FO22}$ and $S_{FO23}$ for outputting the deinterleaver input signal $S_{DII2}$. Of course, the operation of parallel/serial conversion in the parallel/serial converter 514 corresponds to the operation of the serial/parallel conversion in the serial/parallel converter 405 (refer to FIG. 2) included in the transmission signal generation circuits 103 and 104 in the transmitter 301. The deinterleavers 515 and 516 receive respectively the deinterleaver input signals $S_{DII1}$ and $S_{DII2}$ as an input for deinterleaving, and output the deinterleaver output signals $S_{DIO1}$ and $S_{DIO2}$. The deinterleaving operation in the deinterleavers 515 and 516 is the operation reverse to the interleaving operation in the interleaver 404 (refer to FIG. 2) included in the transmission signal generation circuits 103 and 104 in the transmitter 301. The decoders 517 and 518 receive the deinterleaver output signals $S_{DIO1}$ and $S_{DIO2}$ as an input for performing error correction decoding, and output decoded data $S_{DD1}$ and $S_{DD2}$, respectively. These decoded data $S_{DD1}$ and $S_{DD2}$ are respectively the same as the transmission data generated in the transmission signal generation circuits 103 and 104, if the reception signal is normally received and if the error correction decoding is correctly performed.

In the case that the code multiplex number in the signal transmitted by and coming from the transmitter 301 is less than 4, no meaningful signals are outputted from the de-spreaders corresponding to the spread codes which are not used on the side of the transmitter 301. Therefore, the signals coming from those de-spreaders may be ignored for performing the parallel/serial conversion and so forth.

In the code spread radio communication system as described above, one propagation path is formed between the transmission antenna 311 and the reception antenna 321, and another propagation path is formed between the transmission antenna 312 and the reception antenna 322. In these propagation paths, information (transmission data) different from each other is transmitted. Since the same spread codes are used in the both propagation paths, in case that correlation between the propagation paths is high, the information transmitted through one propagation path is interfered by the information transmitted through the other propagation path. This brings an increase in a code error rate in the transmitted information and so forth. Specifically, it becomes difficult to make separation among different transmission signals using the same spread codes in the linear filter and accordingly, the reception characteristic is greatly deteriorated.

In the case of a general CDMA system, for example, the unexamined patent publication No. 2001-008262 (hereinafter referred to as document 1) discloses a technology to assign optimum spread codes according to inter-channel interference. Specifically, the document 1 discloses that inter-channel space correlations and code correlations between spread codes used in the communication are calculated, and products of these space correlations and code correlations are obtained to further obtain time and space correlations, and selection of the spread codes are made so as to lessen the sum of the time and space correlations over the entire channels. However, there is no disclosure of a guideline for a specific spread code assignment to each channel.

On the other hand, the unexamined patent publication No. 2000-059334 (hereinafter referred to as document 2) discloses a method of estimating conditions of propagation paths. This method is such that, on the reception side, two kinds of correlation values in which only codes are different are obtained by de-spread, a variance regarding each of the two kinds of correlation values is calculated, and only the less value of them is used for estimating an interfering wave power.

However, in the conventional code spread radio communication system using a plurality of antennas, the same spread code is used for different propagation paths, and therefore, in case that correlation between propagation paths is high, a problem occurs such that the information mutually interferes each other between such propagation paths, and the reception characteristic is resultantly deteriorated.

An object of this invention is to provide a code assigning method by which even if correlation exists between propagation paths in a code spread radio communication system, spread codes may be dynamically assigned to each propagation path corresponding to the correlation between propagation paths.

Another object of this invention is to provide a code spread radio communication system using the above-mentioned code assigning method.

DISCLOSURE OF THE INVENTION

The spread code assigning method according to the present invention is applied to a code spread radio communication system including a first radio transmission device provided with a transmitter for transmitting different first through Mth code spread transmission signals from each of M (M is an integer of 2 or more) transmission antennas, and a second radio transmission device provided with a receiver for receiving and demodulating first through Mth code spread transmission signals through N (N is an integer of 1 or more) reception antennas.

In a first aspect of the spread code assigning method according to the present invention, a correlation value of each propagation path between each transmission antenna and each reception antenna is calculated. As a result of the calculation, for the ith (i is an integer of 1 or more and M or less) transmission antenna having a propagation path whose correlation value exceeds a predetermined threshold value, only spread codes orthogonal to the spread codes of the jth (j is an integer of 1 or more and M or less, i≠j) transmission antenna corresponding to the concerned correlation value are assigned. On the other hand, for a transmission antenna having no propagation path whose correlation exceeds the threshold value, spread codes are assigned without considering orthogonality to spread codes in the other transmission antennas.

In a second aspect of the spread code assigning method according to the present invention, a correlation value of each propagation path between each transmission antenna and each reception antenna is calculated. As a result of the calculation, for the ith (i is an integer of 1 or more and M or less) transmission antenna having a propagation path whose correlation value exceeds a predetermined threshold value, spread codes having a small cross correlation to the spread codes of the jth (j is an integer of 1 or more and M or less, i≠j) transmission antenna corresponding to the concerned correlation value are preferentially assigned. On the other hand, for a transmission antenna having no propagation path whose correlation exceeds the threshold value, spread codes are assigned without considering orthogonality to spread codes in the other transmission antennas.

In the spread code assigning method according to the second aspect, the spread codes having a small cross correlation to the spread code of the jth transmission antenna are, for example, spread codes orthogonal to the spread codes of the jth transmission antenna.

In a third aspect of the spread code assigning method according to the present invention, a reception quality at a time when each code spread transmission signal is received is detected. In the case that the detected reception quality is below an object minimum value, the maximum value of the number of spread codes assigned to the transmission antenna corresponding to the concerned reception quality is decreased. On the other hand, in the case that the detected reception quality exceeds an object maximum value, the maximum value of the number of spread codes assigned to the transmission antenna corresponding to the concerned reception quality is increased.

A code spread radio communication system according to the present invention includes a first radio transmission device provided with a transmitter for transmitting different first through Mth code spread transmission signals from each of M (M is an integer of 2 or more) transmission antennas, and a second radio transmission device provided with a receiver for receiving and demodulating the first through Mth code spread transmission signals through N (N is an integer of 1 or more) reception antennas.

In a first aspect of the code spread radio communication system according to the present invention, the receiver is provided with a correlation value estimation unit for calculating a correlation value of each propagation path between each transmission antenna and each reception antenna and transmitting the calculated result as propagation path correlation information. On the other hand, the transmitter is provided with a spread code assigning unit. The spread code assigning unit assigns, based on the propagation path correlation information, for the ith (i is an integer of 1 or more and M or less) transmission antenna having a propagation path whose correlation value exceeds a predetermined threshold value, only spread codes orthogonal to the spread codes of the jth (j is an integer of 1 or more and M or less, i≠j) transmission antenna corresponding to the concerned correlation value. On the other hand, the spread code assigning unit assigns spread codes for a transmission antenna having no propagation path whose correlation value exceeds the threshold value, without considering orthogonality to spread codes in the other transmission antennas.

The spread code assigning unit in the first aspect may preferentially assign, based on the propagation path correlation information, for the i-th (i is an integer of 1 or more and M or less) transmission antenna having a propagation path whose correlation value exceeds the predetermined threshold value, spread codes having a small cross correlation to the spread codes of the jth (j is an integer of 1 or more and M or less, i≠j) transmission antenna corresponding to the concerned correlation value. In this case, the spread code assigning unit assigns spread codes for a transmission antenna having no propagation path whose correlation value exceeds the threshold value, without considering orthogonality to spread codes in the other transmission antennas.

In the second aspect of the code spread radio communication system according to the present invention, the receiver is provided with a reception quality detection unit for detecting reception quality at a time when each code spread transmission signal is received and a code multiplex number control signal generating unit. The code multiplex number control signal generating unit, in the case that the reception quality is below an object minimum value, transmits the code multiplex number control information indicating decreasing of the maximum value of the number of spread codes assigned to the transmission antenna corresponding to the concerned reception quality, and on the other hand, in the case that the reception quality exceeds an object maximum value, transmits the code multiplex number control information indicating increasing of the maximum value of the number of spread codes assigned to the transmission antenna corresponding to the concerned reception quality. The transmitter is provided with a spread code assigning unit for assigning spread codes to each transmission antenna based on the code multiplex number control information.

As for the reception quality, any of the packet success rate, the signal to interference signal power ratio, and the bit error rate is used.

BEST MODE FOR CARRYING OUT THE INVENTION

Figure 4:
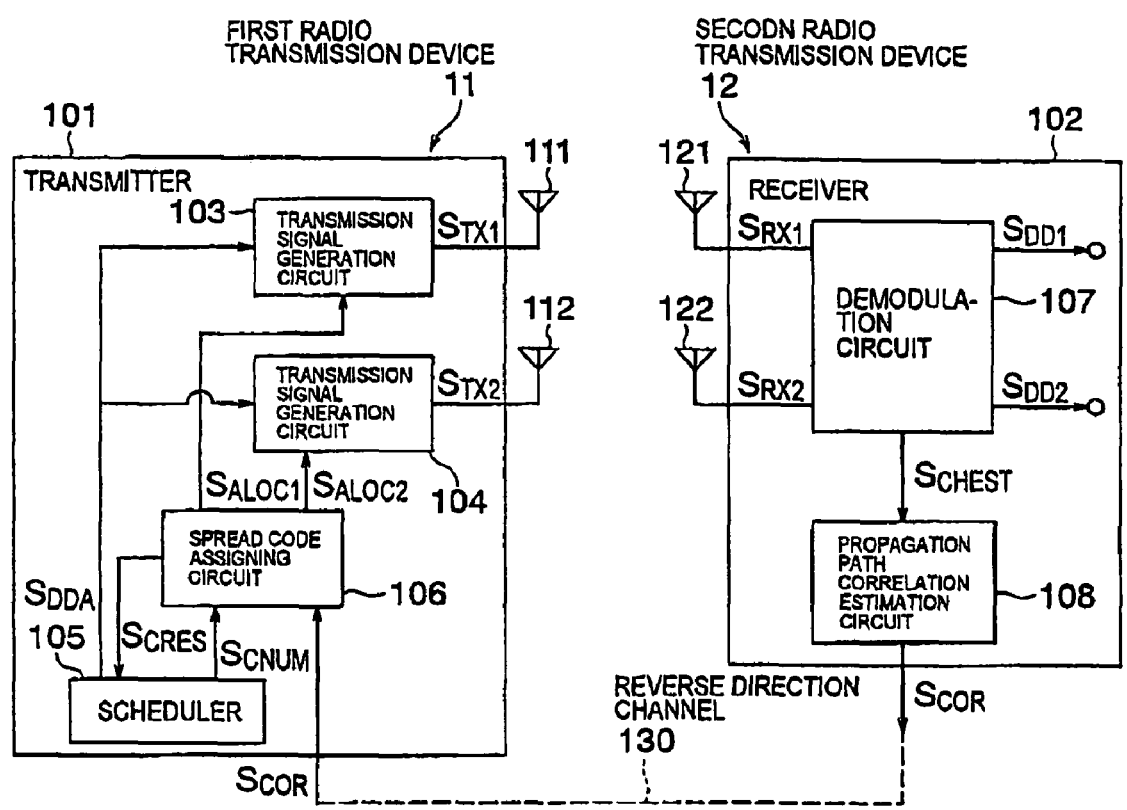
FIG. 4 is a block diagram showing a code spread radio communication system according to the first embodiment of the present invention using a plurality of transmission/reception antennas.

A description of preferred embodiments of the present invention will be provided with reference to the accompanying drawings. FIG. 4 is a block diagram showing a configuration of the spread code radio communication system according to the first embodiment of the present invention.

In FIG. 4, the spread code radio communication system includes a transmitter 101 and a receiver 102. In practice, the transmitter 101 is arranged within the first radio transmission device 11, and the receiver 102 is arranged within the second radio transmission device 12 which is located at a place different from the first radio transmission device 11. The first and second radio transmission devices 11 and 12 mutually perform a two-way radio communication. Therefore, a propagation path towards the first radio transmission device 11 from the second radio transmission device 12 (reverse direction channel 130) is also set. For transmission through the reverse direction channel, the second radio transmission device 12 is provided with a transmitter and an antenna for the reverse direction channel, and the first radio transmission device 11 is provided with a receiver and an antenna for the reverse direction channel. Here, it is assumed that two transmission antennas 111 and 112 are connected to the transmitter 101, and two reception antennas 121 and 122 are connected to the receiver 102.

The transmitter 101 is provided with transmission signal generation circuits 103 and 104 connected to the antennas 111 and 112, respectively, a scheduler 105, and a spread code assigning circuit 106. The scheduler 105 outputs a data making request signal $S_{DDA}$ to the transmission signal generation circuits 103 and 104, and also outputs a code multiplex number notifying signal $S_{CNUM}$ for notifying a code multiplex number corresponding to a data volume to the spread code assigning circuit 106. The spread code assigning circuit 106 supplies spread code assigning signals $S_{ALOC1}$ and $S_{ALOC2}$ to the transmission signal generation circuits 103 and 104, respectively, and also outputs a code multiplex number restriction signal $S_{CRES}$ to the scheduler 105.

Figure 1:
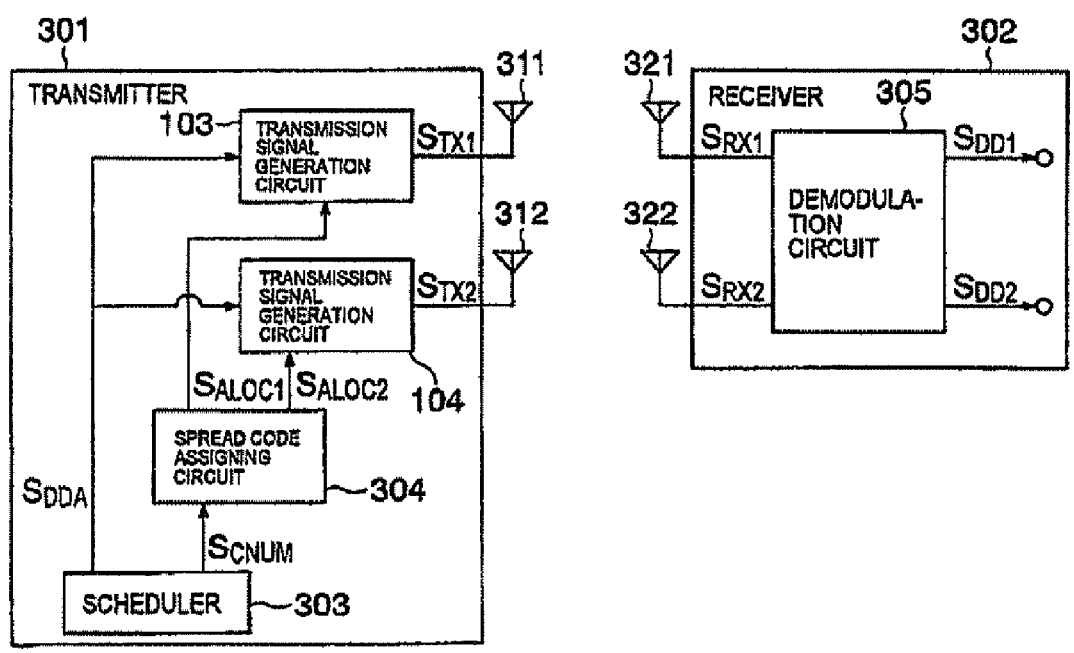
FIG. 1 is a block diagram showing a conventional code spread radio communication system using a plurality of transmission/reception antennas.
Figure 2:
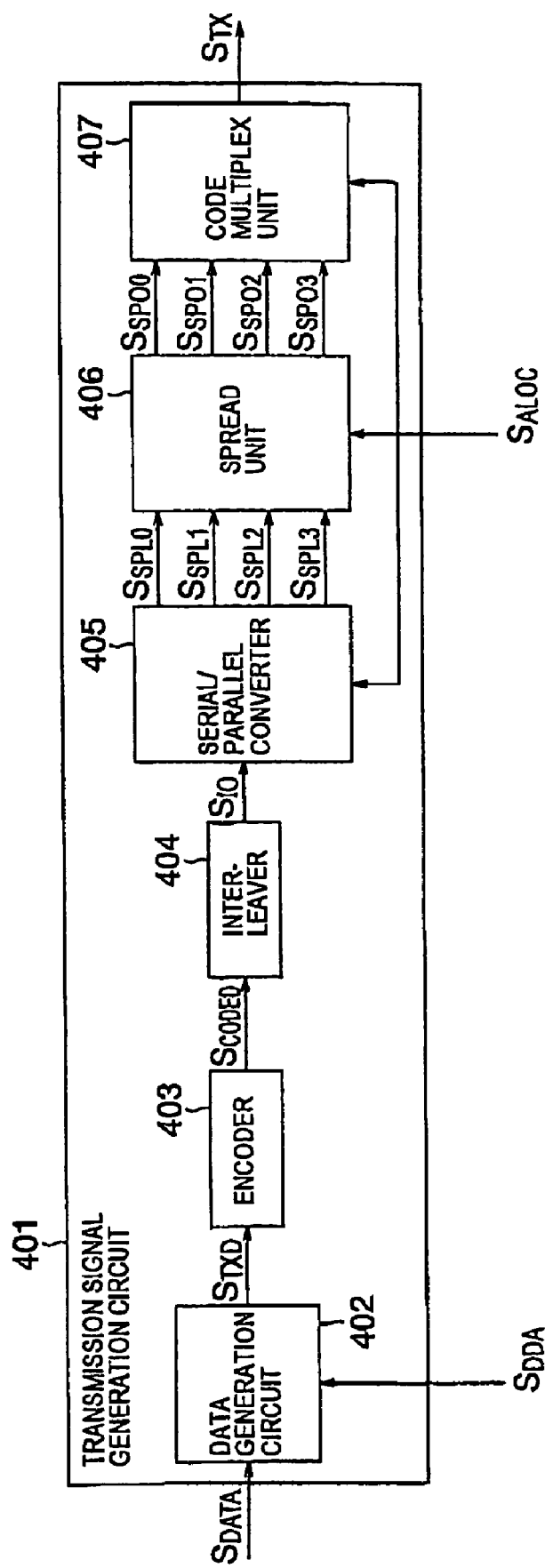
FIG. 2 is a block diagram showing a configuration of a transmission signal generation circuit provided within the transmitter of the code spread radio communication system shown in FIG. 1.

The transmission signal generation circuit 103 receives the data making request signal $S_{DDA}$, the spread code assigning signal $S_{ALOC1}$ and the information to be transmitted, and generates a transmission data from the information to be transmitted according to the data making request signal $S_{DDA}$. The transmission signal generation circuit 103 also spreads and multiplexes the generated transmission data by the spread codes corresponding to the code assigning signal $S_{ALOC1}$, and outputs a transmission signal $S_{TX1}$. The transmission signal $S_{TX1}$ is transmitted through the antenna 111. Similarly, the transmission signal generation circuit 104 generates a transmission data according to the data making request signal $S_{DDA}$. The transmission signal generation circuit 104 spreads and multiplexes the generated transmission data by the spread code corresponding to the spread code assigning signal $S_{ALOC2}$ and outputs a transmission signal $S_{TX2}$. The transmission signal $S_{TX2}$ is transmitted through the antenna 112. As the transmission signal generation circuits 103 and 104, a transmission signal generation circuit 401 shown in FIG. 2 may be used.

The scheduler 105 receives the code multiplex number restriction signal $S_{CRES}$ sent from the spread code assigning circuit 106, and outputs the data making request signal $S_{DDA}$ and the code multiplex number notifying signal $S_{CNUM}$ for notifying a code multiplex number corresponding to a data volume to be transmitted. In this case, the scheduler 105 determines the code multiplex number in the transmission signal generation circuits 103 and 104, within a range of the code multiplex number designated by the code multiplex number restriction signal $S_{CRES}$.

The spread code assigning circuit 106 receives propagation path correlation information $S_{COR}$ sent through the reverse direction channel 130 from the receiver 102 (the second radio transmission device 12) and the code multiplex number notifying signal $S_{CNUM}$ from the scheduler 105. The spread code assigning circuit 106 outputs, to the transmission signal generation circuits 103 and 104, the spread code assigning signals $S_{ALOC1}$ and $S_{ALOC2}$ for designating as many spread codes as the number corresponding to the code multiplex number notifying signal $S_{CNUM}$ received from the scheduler 105. The spread code assigning circuit 106 also, based on the propagation path correlation information $S_{COR}$, determines the upper limit of the code multiplex number in each propagation path, as described later and outputs the code multiplex number restriction signal $S_{CRES}$ representing its limit.

The receiver 102 is provided with a demodulation circuit 107 and a propagation path correlation estimation circuit 108. The demodulation circuit 107 receives the reception signals $S_{RX1}$ and $S_{RX2}$ from the antennas 121 and 122, respectively. The demodulation circuit 107 demodulates the reception signals $S_{RX1}$ and $S_{RX2}$, and also conducts propagation path estimation between transmission/reception antennas to thereby output propagation path estimation information $S_{CHEST}$ to the propagation path correlation estimation circuit 108. The propagation path correlation estimation circuit 108 estimates correlation values of the propagation paths between transmission/reception antennas, based on the propagation path estimation information $S_{CHEST}$, and outputs propagation path correlation information $S_{COR}$. The demodulation circuit 107 outputs, as a result of demodulation of the reception signals $S_{RX1}$ and $S_{RX2}$, regenerated data $S_{DD1}$ and $S_{DD2}$ respectively corresponding to the transmission data generated in the transmission signal generation circuits 103 and 104.

Figure 3:
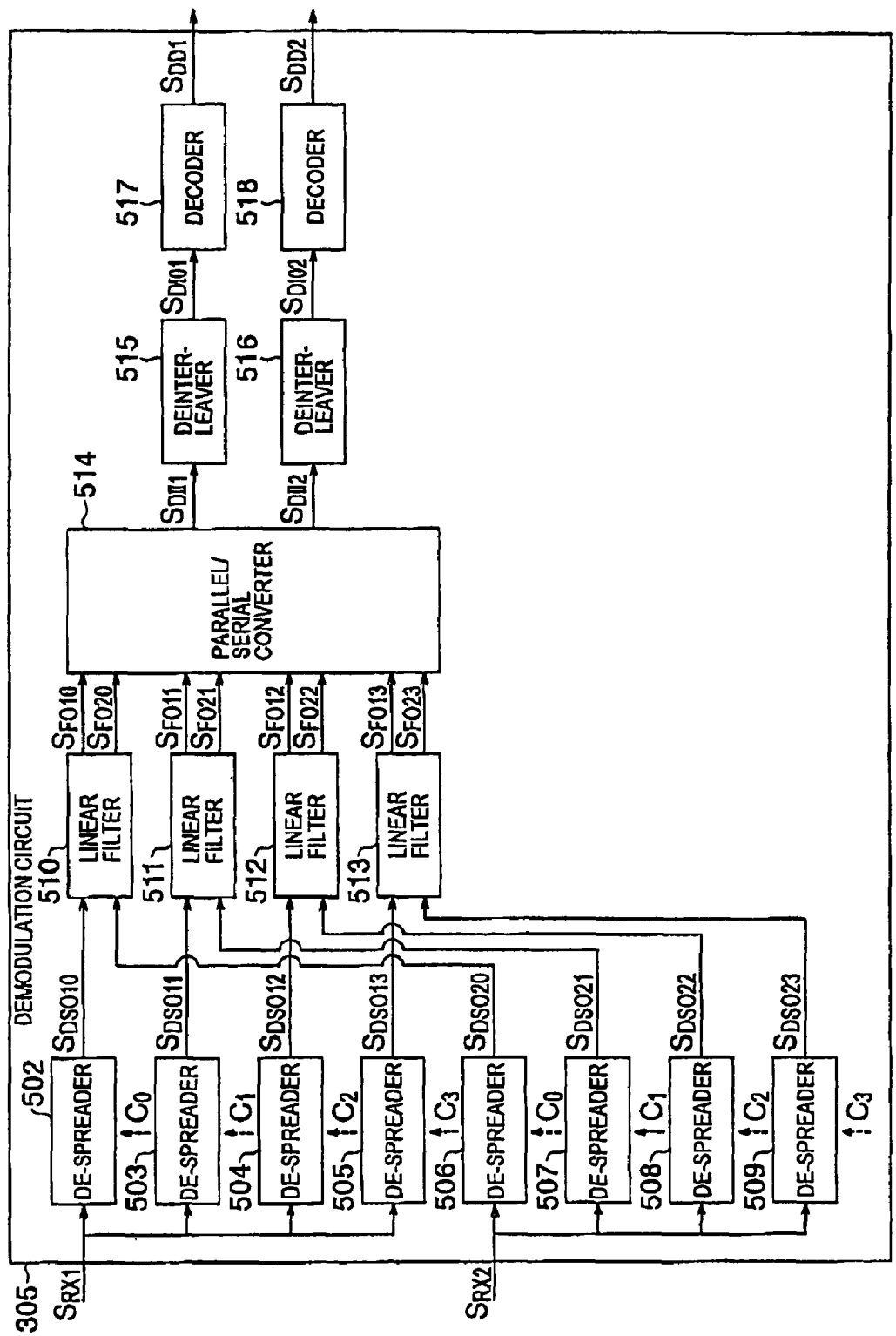
FIG. 3 is a block diagram showing a configuration of a demodulation circuit provided within the receiver of the code spread radio communication system shown in FIG. 1.
Figure 5:
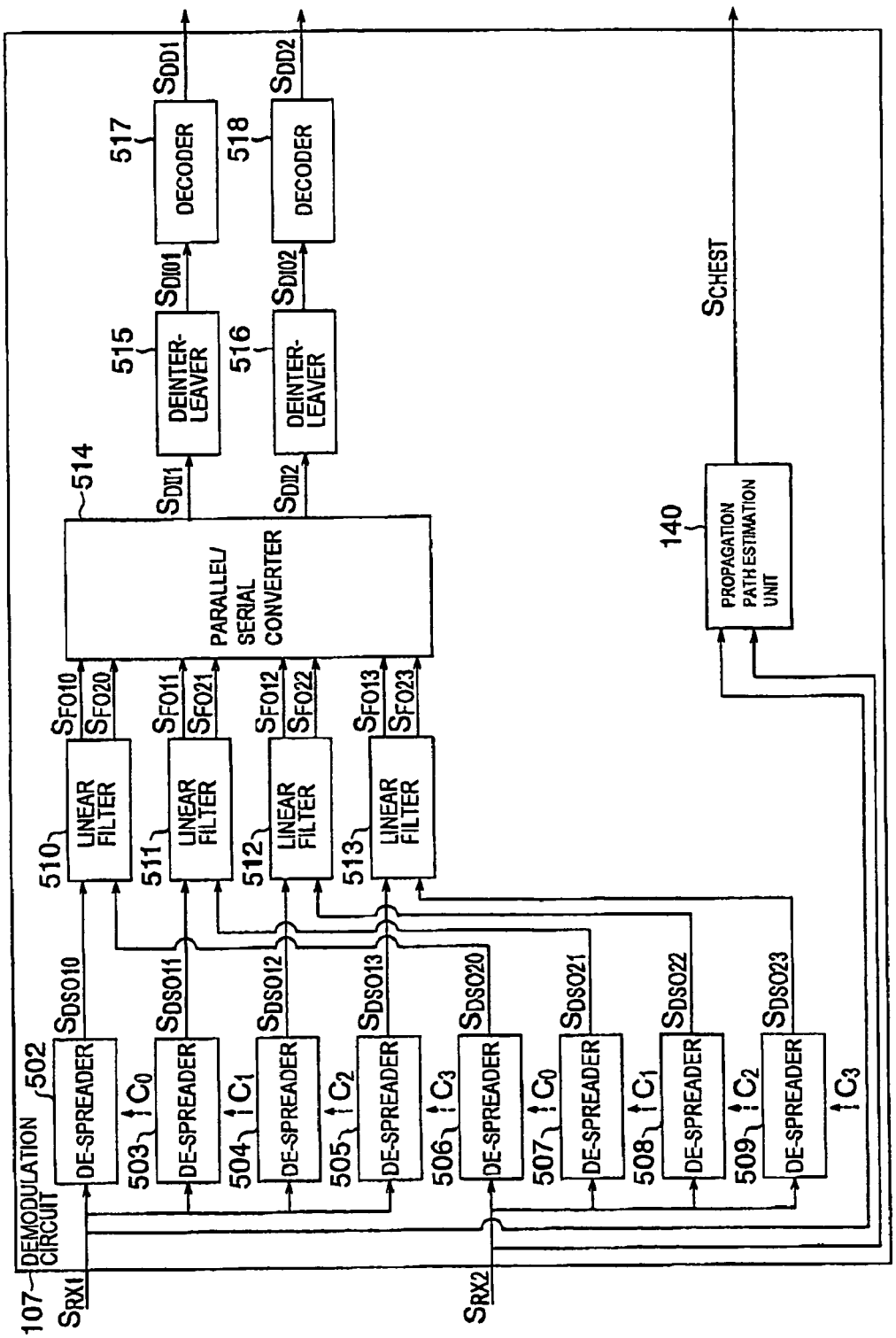
FIG. 5 is a block diagram showing a configuration example of a demodulation circuit provided within the receiver of the code spread radio communication system shown in FIG. 4.

FIG. 5 illustrates an example of an internal configuration of the demodulation circuit 107. Although the demodulation circuit 107 has almost the same configuration as described by referring to FIG. 3, a difference thereof from the demodulation circuit 305 shown in FIG. 3 resides in that the circuit 7 is provided with a propagation path estimation unit 140 for conducting propagation path estimation based on the reception signals $S_{RX1}$ and $S_{RX2}$ received with the antennas 121 and 122, and for outputting the propagation path estimation information $S_{CHEST}$. The propagation path estimation unit 140 conducts propagation path estimation by detecting, for example, a pilot signal transmitted by the transmitter 101. The propagation path estimation using a pilot signal is disclosed, for example, in the afore-mentioned document 2.

The operation of code assignment in the code spread radio communication system will be described.

The demodulation circuit 107 of the receiver 102 always demodulates the reception signals $S_{RX1}$ and $S_{RX2}$ received by the reception antennas 121 and 122 to output the regenerated data $S_{DD1}$ and $S_{DD2}$, and also to output the propagation path estimation information $S_{CHEST}$ by conducting the propagation path estimation. The propagation path correlation estimation circuit 108 calculates correlation values of the propagation paths between transmission/reception antennas based on the propagation path estimation information $S_{CHEST}$, and outputs the calculated result as the propagation path correlation information $S_{COR}$. In this case, it is assumed that the propagation path correlation estimation circuit 108 outputs as the propagation path correlation information $S_{COR}$ the greater value of either the propagation path correlation between the transmission antennas 111 and 112 and the reception antenna 121 or the propagation path correlation between the transmission antennas 111 and 112 and the reception antenna 122. The propagation path correlation information $S_{COR}$ is transmitted through the reverse direction channel 130 to the spread code assigning circuit 106 of the transmitter 101.

The spread code assigning circuit 106 judges that there is no need to place a restriction to the code multiplex number if the propagation path correlation information $S_{COR}$ is smaller than a prescribed threshold value. In case the propagation path correlation information $S_{COR}$ is larger than the threshold value, correlation between the propagation paths is high. In this case, the spread code assigning circuit 106 operates in such a way that spread codes orthogonal to each other and different for each of the propagation paths are assigned to such highly cross correlated propagation paths. Assigning a spread code to a propagation path is to assign the spread code to the transmission signal generation circuit connected to the transmission antenna located at the transmission end of the propagation path. Therefore, the spread code assigning circuit 108 assigns spread codes by sending the spread code assigning signals $S_{ALOC1}$ and $S_{ALOC2}$ to the transmission signal generation circuits 103 and 104, respectively. In this case, as the spread code assigning signal, the spread code itself to be assigned may be used, or the number designating a particular one among a group of spread codes to be used in the spread code radio communication system may be used.

Assuming that the range of the values of the propagation path correlation information $S_{COR}$ is 0 or more and 1 or less (that is, normalized), and that as the above-mentioned threshold value, for example, 0.3 is used. In this case, it is assumed that the spread code assigning circuit 106 gives only spread codes orthogonal to each other to the transmission signal generation circuits 103 and 104, if the propagation path correlation information $S_{COR}$ is 0.3 or more.

Figure 6:
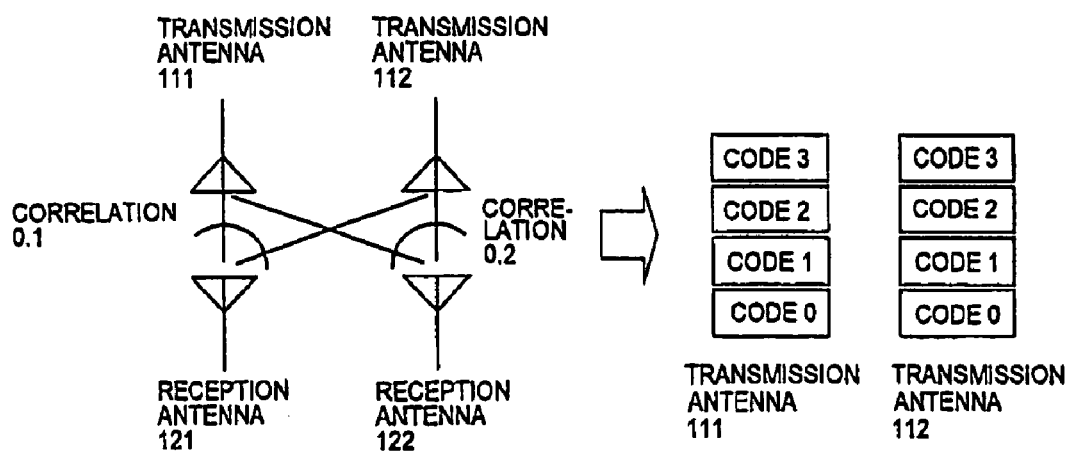
FIG. 6 is a diagram to explain an example of correlation of each propagation path between transmission antennas and reception antennas and spread code assignment.

FIG. 6 illustrates an example of cross correlation of each propagation path between the transmission antennas 111 and 112 and the reception antennas 121 and 122. In this example, correlation of a propagation path between the transmission antennas 111 and the reception antennas 121 with a propagation path between the transmission antennas 112 and the reception antennas 121 is 0.1. On the other hand, correlation of a propagation path between the transmission antennas 111 and the reception antennas 122 with a propagation path between the transmission antennas 112 and the reception antennas 122 is 0.2. Therefore, as the propagation path correlation information $S_{COR}$, the information representing 0.2 is transmitted to the spread code assigning circuit 106. Then, since the propagation path correlation information $S_{COR}$ is less than 0.3 of the threshold value, code assignment is not restricted and the code multiplex number restriction signal $S_{CRES}$ becomes 4 of its maximum value. Therefore, all the spread codes (code 0 through code 4 shown in the figure) can be assigned to both of the transmission antennas 111 and 112 (that is, the transmission signal generation circuits 103 and 104).

Figure 7:
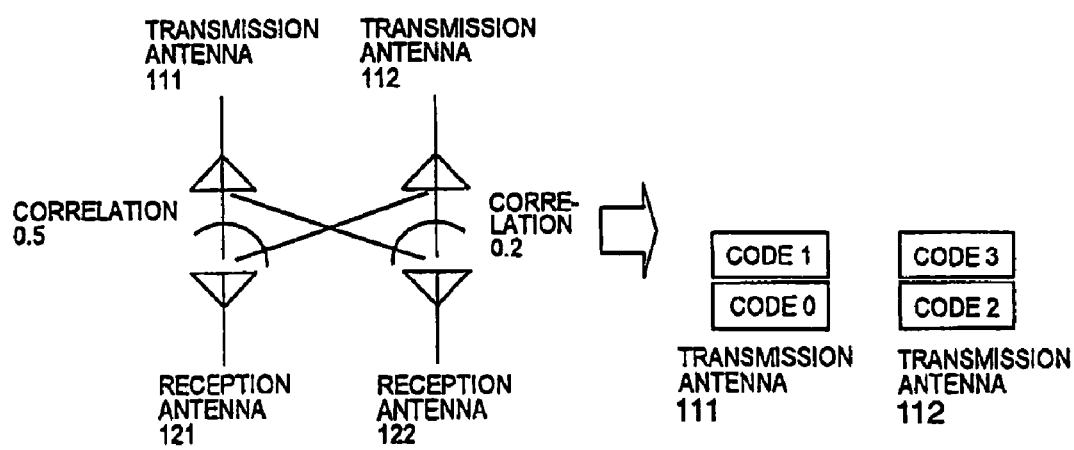
FIG. 7 is a diagram to explain another example of correlation of each propagation path between transmission antennas and reception antennas and spread code assignment.

FIG. 7 illustrates, similarly to FIG. 6, an example of cross correlation of each propagation path between the transmission antennas 111 and 112 and the reception antennas 121 and 122. In this example, correlation of a propagation path between the transmission antennas 111 and the reception antennas 121 with a propagation path between the transmission antennas 112 and the reception antennas 121 is 0.5. On the other hand, correlation of a propagation path between the transmission antennas 111 and the reception antennas 122 with a propagation path between the transmission antennas 112 and the reception antennas 122 is 0.2. In this case, the propagation path correlation information $S_{COR}$ is 0.5, and since it is greater than 0.3 of the threshold value, spread codes to be assigned to the transmission antennas 111 and 112 are required to be orthogonal to each other. Therefore, only two spread codes at the most can be assigned to the transmission antennas 111 and 112 (that is, the transmission signal generation circuits 103 and 104). The spread code assigning circuit 106 outputs information representing 2 as the code multiplex number restriction signal $S_{CRES}$, and also as the spread codes, assigns code 0 and code 1 to the transmission antenna 111 and assigns code 2 and code 3 to the transmission antenna 112. These spread codes are orthogonal to each other. In this case, although the number of spread codes assignable to the transmission antennas 111 and 112 is restricted, a deterioration of the characteristic due to high propagation path correlation can be suppressed.

As described above, according to the first embodiment, the code multiplex number set to each propagation path can be adaptively controlled according to the correlations of the propagation paths between the transmission/reception antennas. In this embodiment, a transmission of high composite gain can be realized, by preferentially assigning an antenna of a good propagation path quality to a transmission signal that is required a large SIR (signal to interference wave power ratio).

In the above first embodiment, for the sake of simplicity, the description was provided for the case that the number of the transmission antennas and the reception antennas is respectively two, the present invention is not limited to this case. Considering that the MIMO method uses the independency of propagation paths and spread codes are assigned to every transmission antenna, it is necessary that the number of transmission antennas is two or more. However the reception antenna may be one or more. Even if code spread transmission signals from a plurality of transmission antennas are received by a single reception antenna, if the spread codes are orthogonal or nearly orthogonal, the reception can be made sufficiently well. Accordingly, the number of the transmission antennas and the number of the reception antennas are not needed to be identical.

As described above, in the case that the number of the transmission antennas is M (M≧2) and each of them transmits different code spread transmission signals, the correlation values of the propagation paths between M transmission antennas and N reception antennas are calculated, where the number of the reception antennas is N (N≧1). For the ith (i is an integer of 1 or more and M or less) transmission antenna having a propagation path whose calculated correlation value is higher than the threshold value, only spread codes orthogonal to the jth (j is an integer of 1 or more and M or less, i≠j) transmission antenna corresponding to the correlation value having exceeded the threshold value are assigned (or spread codes orthogonal to each other are preferentially assigned). On the other hand, for a transmission antenna having no propagation path of a high correlation value, spread codes are assigned without considering orthogonality of the spread codes to the other antennas.

By the way, when the number of transmission antennas or reception antennas is large, the number of supposed propagation paths becomes large accordingly and it becomes difficult to determine which correlation value should be used in the above-mentioned threshold decision. Therefore, in the present invention, a standard correlation value is introduced as a correlation value used in the threshold decision. With regard to this standard correlation value, for example, correlation values of a propagation path between the ith transmission antenna and the kth (k is an integer of 1 or more and N or less) reception antenna with propagation paths between the first, second, ..., (i−1)th, (i+1)th, ..., Mth transmission antennas and the kth reception antenna are calculated to the entire reception antennas, and the maximum value among the (M−1)×N correlation values thus obtained may be set as the standard correlation value. Otherwise, correlation values of a propagation path between the ith transmission antenna and the kth (k is an integer of 1 or more and N or less) reception antenna with propagation paths between the first, second, ..., (i−1)th, (i+1)th, ..., Mth transmission antennas and the kth reception antenna are calculated to the entire reception antennas, and an average value among the (M−1)×N correlation values thus obtained may be set as the standard correlation value.

Further, in the case that the spread codes orthogonal to each other are preferentially assigned to the transmission antennas, as it may be clear from the above-mentioned explanation, the maximum number of spread codes assigned to the transmission antennas decreases. The threshold value in correlation values may be set in a plurality of steps so that the code multiplex number for each transmission antenna is determined according to which step the correlation value is at. In this case, when the correlation value used in the threshold decision is the above-mentioned standard correlation value and L threshold values of $x_0, x_1, \ldots, x_{(L-1)}$ ($0 \leq X_0 \leq X_1 \leq \ldots \leq x_{(L-1)} \leq 1$) are set, if the standard correlation value R is $x_p \leq R < x_{(p+1)}$ (p is an integer of 0 or more and (L−1) or less), for example, the code multiplex number of the transmission antenna corresponding to the standard correlation value can be set to be (L−p).

Figure 8:
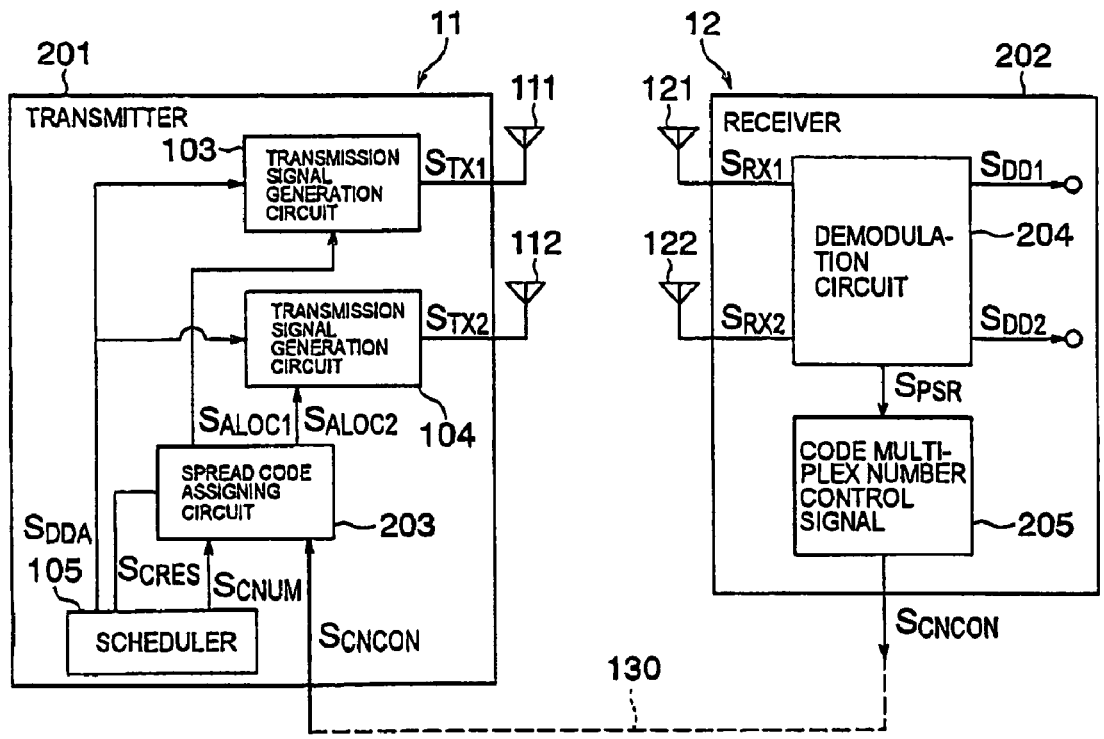
FIG. 8 is a block diagram showing a code spread radio communication system according to the second embodiment of the present invention using a plurality of transmission/reception antennas.

FIG. 8 is a block diagram illustrating a configuration of a code spread radio communication system according to a second embodiment of the present invention.

This code spread radio communication system includes, in the same way as the code spread radio communication system as shown in FIG. 4, a transmitter 201 provided within the first radio transmission device 11 and a receiver 202 provided within the second radio transmission device 12. In this second embodiment, the transmitter 201 is provided with transmission antennas 111 and 112, and the receiver 202 is provided with reception antennas 121 and 122.

Although the transmitter 201 has a configuration similar to the transmitter 101 shown in FIG. 4, it is provided with a spread code assigning circuit 203 different from the spread code assigning circuit 106 in FIG. 4. That is, the spread code assigning circuit 203 in the second embodiment is inputted through the reverse direction channel 130 from the side of the receiver 202, a code multiplex number control information $S_{CNCON}$ instead of the propagation path correlation information $S_{COR}$. The spread code assigning circuit 203 increases or decreases the maximum code multiplex number assignable to each transmission antenna based on the code multiplex number control information $S_{CNCON}$, and outputs a code multiplex number restriction signal $S_{CRES}$ to the scheduler 105. The spread code assigning circuit 203 also outputs the spread code assigning signals $S_{ALOC1}$ and $S_{ALOC2}$ for designating as many spread codes as the number corresponding to the code multiplex number notifying signal $S_{CNUM}$ received from the scheduler 105, to the transmission signal generation circuits 103 and 104.

The transmission signal generation circuits 103 and 104 and the scheduler 105 in the transmitter 201 are the same as those in the transmitter 101 shown in FIG. 4. The transmission signal generation circuit 103 receives the data making request signal $S_{DDA}$ sent from the scheduler 105 and the spread code assigning signal $S_{ALOC1}$ sent from the spread code assigning circuit 203 and makes a transmission data, and spreads and multiplexes with the spread codes corresponding to the code assigning signal $S_{ALOC1}$, and outputs a transmission signal $S_{TX1}$. Similarly, the transmission signal generation circuit 104 receives the data making request signal $S_{DDA}$ and the spread code assigning signal $S_{ALOC2}$ and makes a transmission data, and spreads and multiplexes with the spread codes corresponding to the code assigning signal $S_{ALOC2}$, and outputs a transmission signal $S_{TX2}$. The scheduler 105 receives the code multiplex number restriction signal $S_{CRES}$, and outputs the data making request signal $S_{DDA}$ and the code multiplex number notifying signal $S_{CNUM}$ for notifying a code multiplex number corresponding to a data volume.

The receiver 202 receives the reception signals $S_{RX1}$ and $S_{RX2}$ respectively from the antennas 121 and 122. The receiver 202 is provided with a demodulation circuit 204 and a code multiplex number control signal generation circuit 205. The demodulation circuit 204 demodulates the reception signals $S_{RX1}$ and $S_{RX2}$, and also calculates a packet success rate for each of the regenerated data $S_{DD1}$ and $S_{DD2}$ and outputs a packet success rate information $S_{PSR}$. The code multiplex number control signal generation circuit 205 outputs the code multiplex number control information $S_{CNCON}$ based on the packet success rate information $S_{PSR}$. The demodulation circuit 104 outputs, as the result of having demodulated the reception signals $S_{RX1}$ and $S_{RX2}$, the regenerated data $S_{DD1}$ and $S_{DD2}$ respectively corresponding to the transmission data generated in the transmission signal generation circuit 103 and 104. Here, the packet success rate is used as an indicator of reception quality.

Figure 9:
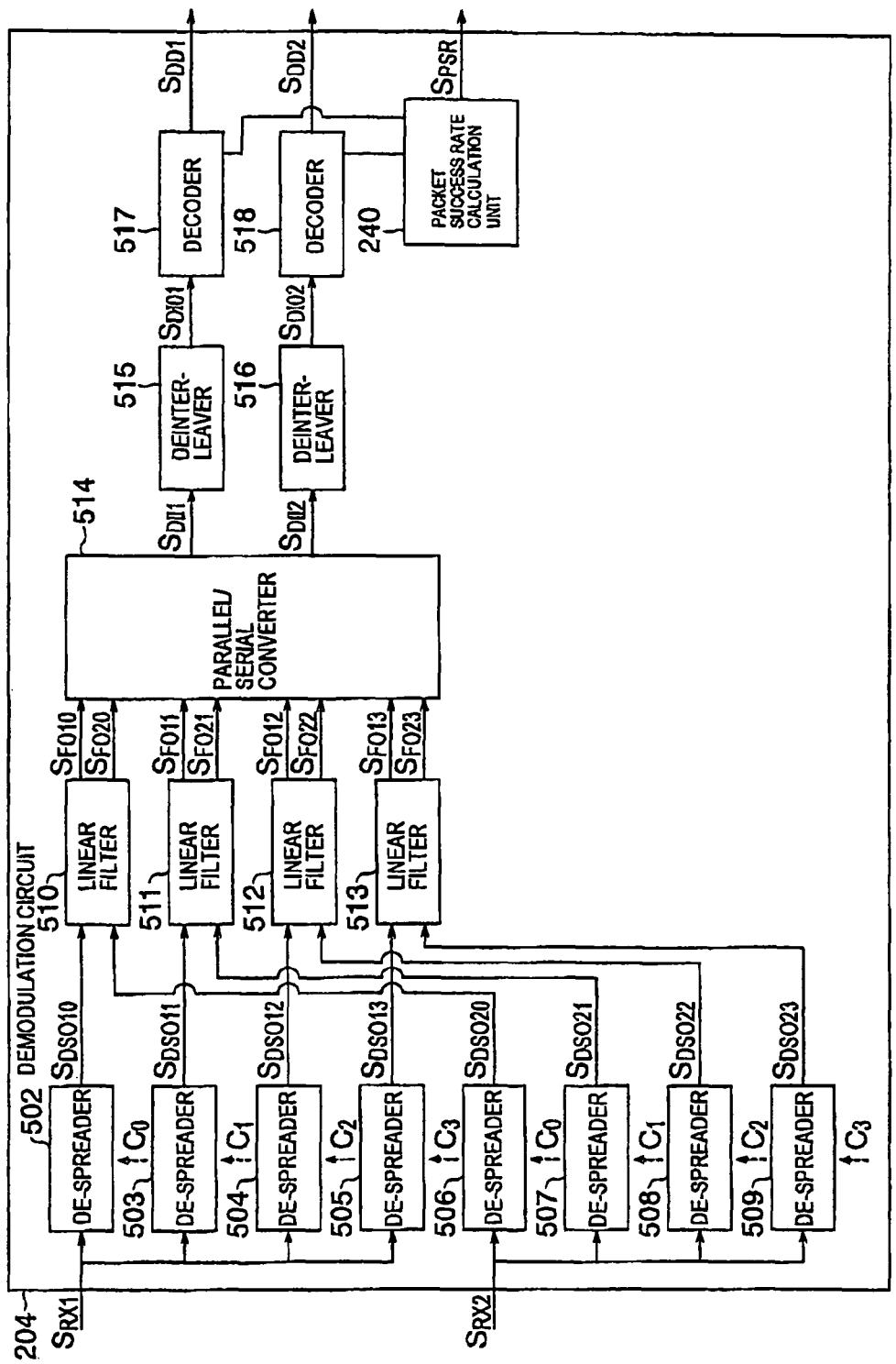
FIG. 9 is a block diagram showing a configuration example of a demodulation circuit provided within the receiver of the code spread radio communication system shown in FIG. 8.

FIG. 9 illustrates an example of the internal configuration of the demodulation circuit 204. The demodulation circuit 107 has almost the same configuration as the demodulation circuit 305 in the conventional spread code radio communication system explained in FIG. 3, except that it is provided with a packet success rate calculation unit 240. The packet success rate calculation unit 240 calculates the packet success rate for each of the regenerated data $S_{DD1}$ and $S_{DD2}$ based on the error correction decoding in the decoders 517 and 518, and outputs the calculated result as the packet success rate information $S_{PSR}$.

The code multiplex number control signal generation circuit 205 determines increase or decrease of the maximum code multiplex number in the transmission antennas 111 and 112 based on the packet success rate information $S_{PSR}$, and outputs the code multiplex number control information $S_{CNCON}$. Specifically, a maximum object value and a minimum object value are previously determined. The code multiplex number control signal generation circuit 205, if the lower value of either of the packet success rates corresponding to the regenerated data $S_{DD1}$ and $S_{DD2}$ exceeds the maximum object value, outputs such code multiplex number control information $S_{CNCON}$ as to increase the maximum code multiplex number to be assigned to the transmission antennas 111 and 112 by 1. On the other hand, if the lower value of either of the packet success rates corresponding to the regenerated data $S_{DD1}$ and $S_{DD2}$ is below the minimum object value, the code multiplex number control signal generation circuit 205 outputs such code multiplex number control information $S_{CNCON}$ as to decrease the maximum code multiplex number by 1. The code multiplex number control information $S_{CNCON}$ is transmitted through the reverse direction channel 130 to the transmitter 201.

The following is a description concerning increase and decrease of the maximum code multiplex number assuming that the maximum object value is 0.8 and the minimum object value is 0.4.

Figure 10:
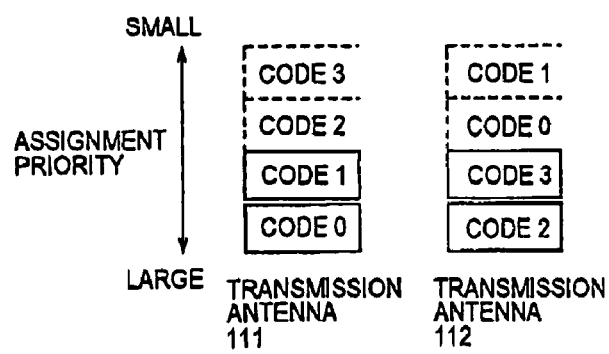
FIG. 10 is a diagram to explain spread code assignment in the second embodiment of the present invention.

FIG. 10 assumes a status that two spread codes orthogonal between antennas are assigned respectively to the antennas 111 and 112 as an initial status. Here, it is assumed that the packet success rates corresponding to the regenerated data $S_{DD1}$ and $S_{DD2}$ are respectively 0.9 and 0.85. In this case, since the lower packet success rate 0.85 exceeds the maximum object value 0.8, such code multiplex number control information $S_{CNCON}$ as to increase the maximum code multiplex number assigned to the transmission antennas 111 and 112 by 1 is transmitted to the spread code assigning circuit 203. The spread code assigning circuit 203, based on the code multiplex number control information $S_{CNCON}$, changes the spread codes assigned to the transmission signal generation circuits 103 and 104 from 2 to 3 respectively.

In the example shown in FIG. 10, code 2 and code 0 are additionally assigned respectively. Therefore, spread codes non-orthogonal to each other are used between the transmission antenna 111 and 112.

Subsequently, it is assumed that the packet success rates corresponding to the regenerated data $S_{DD1}$ and $S_{DD2}$ are respectively 0.3 and 0.4. In this case, since the lower packet success rate 0.3 is below the minimum object value 0.4, such code multiplex number control information $S_{CNCON}$ as to decrease the maximum code multiplex number assigned to the transmission antennas 111 and 112 by 1 is transmitted to the spread code assigning circuit 203. If the packet success rate is 0.4 (the minimum object value) or more and 0.8 (the maximum object value) or less, the maximum code multiplex number is not changed.

As shown in FIG. 10, a priority of spread codes assignment is set for each transmission antenna. In this case, when the maximum code multiplex number assigned to the transmission antennas is small, different spread codes orthogonal to each other are used for each transmission antenna. And, when the maximum code multiplex number assigned to each transmission antenna becomes large, the same spread codes are used for different transmission antennas.

As explained above, also in the second embodiment, the code multiplex number set to each propagation path is dynamically controlled according to the correlation of the propagation paths between transmission/reception antennas. Further, in the second embodiment, although the increase or decrease of the code multiplex number is assumed to be common to entire antennas, it is possible to independently control the increase or decrease of the code multiplex number. For example, based on the packet success rate of each reception antenna, the maximum code multiplex number assigned to the transmission antenna transmitting the transmission signal received by the reception antenna may be increased or decreased. Furthermore, although the packet success rate is used as a reception quality, as another reception quality, for example, the signal to interference wave power ratio, the bit error rate or the like may be used.

The number of the transmission antennas or the reception antennas is not limited to 2 also in the second embodiment. For the same reason as the case of the first embodiment, the number of the transmission antennas is required to be two or more, but the reception antenna may be 1 or more. Also, the number of the transmission antennas and reception antennas is not required to be identical.

According to the present invention, as described above, by means of adaptively performing spread codes assignment including the number of the spread codes used, to the transmission antennas according to the propagation path correlations, the characteristic deterioration due to propagation path correlations in the spread code radio communication system using a plurality of transmission/reception antennas can be improved.

INDUSTRIAL APPLICABILITY

The present invention is applicable to code spread radio communication systems using a plurality of transmission/reception antennas on the whole.

The invention claimed is:

1. A spread code assigning method, for use in a code spread radio communication system including a first radio transmission device provided with a transmitter for transmitting different first through Mth code spread transmission signals from each of M (M is an integer of 2 or more) transmission antennas, and a second radio transmission device provided with a receiver for receiving and demodulating the first through Mth code spread transmission signals through N (N is an integer of 1 or more) reception antennas, for assigning spread codes to each of the transmission antennas, comprising:

calculating a correlation value of each of the propagation paths between the transmission antennas and the reception antennas;

preferentially assigning, to the ith (i is an integer of 1 or more and M or less) transmission antenna having a propagation path of a correlation value exceeding a predetermined threshold value, only spread codes orthogonal to the spread codes of the jth (j is an integer of 1 or more and M or less, i≠j) transmission antenna corresponding to the correlation value or spread codes having a small cross correlation value to spread codes of the jth transmission antenna corresponding to the correlation value, and assigning, to a transmission antenna having no propagation path of a correlation value exceeding the threshold value, spread codes without considering orthogonality to spread codes in the other transmission antennas.

2. The spread code assigning method as claimed in claim 1, wherein spread codes having a small cross correlation value to the spread codes of the jth transmission antenna are spread codes orthogonal to the spread codes of the jth transmission antenna.

3. The spread code assigning method as claimed in claim 1 or 2, wherein a standard correlation value is calculated based on each of the correlation values of the propagation paths between the M transmission antennas and the N reception antennas, and in the case of preset L threshold values of $x_0$, $x_1, \ldots, x_{(L-1)}$ ($0 \leq x_0 \leq x_1 \leq \ldots \leq x_{(L-1)} \leq 1$), the standard correlation value is $x_p$ or more and below $x_{(p+1)}$ (p is an integer of 0 or more and (L−1) or less), a code multiplex number for the transmission antenna corresponding to the standard correlation value is set to be (L−p).

4. The spread code assigning method as claimed in claim 3, wherein the standard correlation value is the maximum value among the (M−1)×N correlation values obtained by calculating correlation values of a propagation path between the ith transmission antenna and the kth (k is an integer of 1 or more and N or less) reception antenna with propagation paths between the first, second, . . . , (i−1)th, (i+1)th, . . . , Mth transmission antennas and the kth reception antenna for the entire reception antennas.

5. The spread code assigning method as claimed in claim 3, wherein the standard correlation value is an average value among the (M−1)×N correlation values obtained by calculating correlation values of a propagation path between the ith transmission antenna and the kth (k is an integer of 1 or more and N or less) reception antenna with propagation paths between the first, second, . . . , (i−1)th, (i+1)th, . . . , Mth transmission antennas and the kth reception antenna for the entire reception antennas.

6. The spread code assigning method as claimed in claim 1 or 2, wherein a correlation value compared with the threshold value is a standard correlation value calculated based on a cross correlation value of each of the propagation paths between the M transmission antennas and the N reception antennas.

7. The spread code assigning method as claimed in claim 6, wherein the standard correlation value is the maximum value among the (M−1)×N correlation values obtained by calculating correlation values of a propagation path between the ith transmission antenna and the kth (k is an integer of 1 or more and N or less) reception antenna with propagation paths between the first, second, . . . , (i−1)th, (i+1)th, . . . , Mth transmission antennas and the kth reception antenna for the entire reception antennas.

8. The spread code assigning method as claimed in claim 6, wherein the standard correlation value is an average value among the (M−1)×N correlation values obtained by calculating correlation values of a propagation path between the ith transmission antenna and the kth (k is an integer of 1 or more and N or less) reception antenna with propagation paths between the first, second, . . . , (i−1)th, (i+1)th, . . . , Mth transmission antennas and the kth reception antenna for the entire reception antennas.

9. A spread code assigning method, for use in a code spread radio communication system including a first radio transmission device provided with a transmitter for transmitting different first through Mth code spread transmission signals from each of M (M is an integer of 2 or more) transmission antennas, and a second radio transmission device provided with a receiver for receiving and demodulating the first through Mth code spread transmission signals through N (N is an integer of 1 or more) reception antennas, for assigning spread codes to each of the transmission antennas comprising:

detecting a reception quality at a time when each of said code spread transmission signals is received;

reducing, in the case that the detected reception quality is below an object minimum value, a maximum value of number of the spread codes assigned to the transmission antenna corresponding to the reception quality;

increasing, in the case that the detected reception quality exceeds an object maximum value, the maximum value of the number of spread codes assigned to the transmission antenna corresponding to the reception quality; and transmitting information from the transmission antenna with an assigned spread code selected from the spread codes assigned to the transmission antenna.

10. The spread code assigning method as claimed in claim 9, wherein as the reception quality, any of a packet success rate, a signal to interference signal power ratio, or a bit error rate is used.

11. The spread code assigning method as claimed in claim 9 or 10, wherein a priority order of assigned spread codes is set for each transmission antenna, and in the case that the maximum value of the number of the spread codes assigned to each transmission antenna is relatively small, different spread codes orthogonal to each other are assigned to each of the transmission antennas.

12. A code spread radio communication system including a first radio transmission device provided with a transmitter for transmitting different first through Mth code spread transmission signals from each of M (M is an integer of 2 or more) transmission antennas, and a second radio transmission device provided with a receiver for receiving and demodulating the first through Mth code spread transmission signals through N (N is an integer of 1 or more) reception antennas, wherein the receiver is provided with a correlation value estimation unit for calculating a correlation value of each propagation path between each of the transmission antennas and each of the reception antennas and transmitting the calculated result as propagation path correlation information, wherein the transmitter is provided with a spread code assigning unit, and wherein the spread code assigning unit, based on the propagation path correlation information, assigns, to the ith is an integer of 1 or more and M or less) transmission antenna having a propagation path of a correlation value exceeding a predetermined threshold value, only spread codes orthogonal to the spread codes of the jth (j is an integer of 1 or more and M or less, i≠j) transmission antenna corresponding to the correlation value, and assigns, to a transmission antenna having no propagation path of a correlation value exceeding the threshold value, spread codes without considering orthogonality to spread codes in the other transmission antennas.

13. The code spread radio communication system as claimed in claim 12, wherein the spread code assigning unit preferentially assigns, based on the propagation path correlation information, to the ith (i is an integer of 1 or more and M or less) transmission antenna having a propagation path of a correlation value exceeding a predetermined threshold value, spread codes having a small cross correlation value to the spread codes of the jth (j is an integer of 1 or more and M or less, i≠j) transmission antenna corresponding to the correlation value, and assigns, to a transmission antenna having no propagation path of a correlation value exceeding the threshold value, spread codes without considering orthogonality to spread codes in the other transmission antennas.

14. The code spread radio communication system as claimed in claim 13, wherein the spread codes having a small cross correlation value to the spread codes of the jth transmission antenna are spread codes orthogonal to the spread codes of the jth transmission antenna.

15. A code spread radio communication system including a first radio transmission device provided with a transmitter for transmitting different first through Mth code spread transmission signals from each of M (M is an integer of 2 or more) transmission antennas, and a second radio transmission device provided with a receiver for receiving and demodulating the first through Mth code spread transmission signals with N (N is an integer of 1 or more) reception antennas, wherein the receiver is provided with a reception quality detection unit for detecting reception quality at a time when each of the code spread transmission signals is received and a code multiplex number control signal generating unit, the code multiplex number control signal generating unit, in the case that the reception quality is below an object minimum value, transmitting the code multiplex number control information indicating decreasing of the maximum value of the number of spread codes assigned to the transmission antenna corresponding to the concerned reception quality, and also, in the case that the reception quality exceeds an object maximum value, transmitting the code multiplex number control information indicating increasing of the maximum value of the number of spread codes assigned to the transmission antenna corresponding to the concerned reception quality, and wherein the transmitter is provided with a spread code assigning unit for assigning spread codes to each of the transmission antenna based on the code multiplex number control information, and the transmitter transmits information from the transmission antenna corresponding to the concerned reception quality and transmits the information with an assigned spread code selected from the spread codes assigned to the transmission antenna.

16. The code spread radio communication system as claimed in claim 15, wherein the reception quality is any of a packet success rate, a signal to interference signal power ratio, or a bit error rate.

* * * * *